(12) United States Patent
Matsunaga et al.

(10) Patent No.: US 7,218,999 B2
(45) Date of Patent: May 15, 2007

(54) TARGET VALUE PROCESSING UNIT, TEMPERATURE CONTROLLER, CONTROL PROCESS IMPLEMENTING SYSTEM, PROCESS CONTROLLING METHOD, TARGET VALUE PROCESSING PROGRAM, AND RECORDING MEDIUM

(75) Inventors: Nobutomo Matsunaga, Kumamoto (JP); Shigeyasu Kawaji, Kumamoto (JP); Ikuo Nanno, Okayama (JP); Masahito Tanaka, Okayama (JP); Takaaki Yamada, Okayama (JP); Yosuke Iwai, Okayama (JP); Takeshi Wakabayashi, Okayama (JP); Kazuo Tsuboi, Okayama (JP)

(73) Assignee: Omron Corporation, Kyoto-shi (JP)

( * ) Notice: Subject to any disclaimer, the term of this patent is extended or adjusted under 35 U.S.C. 154(b) by 163 days.

(21) Appl. No.: 11/062,756

(22) Filed: Feb. 23, 2005

(65) Prior Publication Data
US 2005/0192681 A1  Sep. 1, 2005

(30) Foreign Application Priority Data
Feb. 24, 2004 (JP) ............................. 2004-048172
Jan. 26, 2005 (JP) ............................. 2005-018005

(51) Int. Cl.
*G05D 23/00* (2006.01)
*G05B 13/02* (2006.01)

(52) U.S. Cl. ..................... 700/299; 700/28; 700/33; 700/46; 700/300; 701/22; 701/101; 701/108; 702/179; 702/180; 702/181; 123/406.12; 123/406.19

(58) Field of Classification Search ................. 700/28, 700/12, 13, 14, 26, 30–31, 33–34, 46, 37, 700/52–53, 50–51, 300; 701/108, 22, 274, 701/101; 123/406.12, 406.19; 702/179, 702/180, 181
See application file for complete search history.

(56) References Cited

U.S. PATENT DOCUMENTS

| | | | | |
|---|---|---|---|---|
| 4,606,313 A | * | 8/1986 | Izumi et al. | 123/386 |
| 5,510,809 A | | 4/1996 | Sakai et al. | |
| 6,038,500 A | * | 3/2000 | Weiss | 701/22 |
| 6,189,317 B1 | * | 2/2001 | Yasui et al. | 60/284 |
| 6,321,152 B1 | | 11/2001 | Amborski et al. | |
| 6,521,805 B2 | * | 2/2003 | Arrivat et al. | 585/502 |
| 6,744,521 B1 | * | 6/2004 | Hertling et al. | 356/503 |
| 6,984,589 B2 | * | 1/2006 | Tanaka et al. | 438/714 |
| 6,990,402 B2 | * | 1/2006 | Yasui et al. | 701/108 |
| 7,092,798 B2 | * | 8/2006 | Mansingh et al. | 700/292 |

FOREIGN PATENT DOCUMENTS

| | | |
|---|---|---|
| EP | 0 531 532 A1 | 3/1993 |
| EP | 0 660 208 A1 | 6/1995 |
| EP | 0 911 708 A1 | 4/1999 |
| EP | 001569054 A2 * | 8/2005 |
| JP | 5-035304 A | 2/1993 |

* cited by examiner

*Primary Examiner*—Ramesh Patel
(74) *Attorney, Agent, or Firm*—Foley & Lardner LLP

(57) ABSTRACT

A target value processing unit, includes: an input section to which a target value signal showing a target value of a control process is inputted; a target value shaping unit shaping the target value signal inputted to the input section, into a signal form which is proper for a control treatment of a regulator implementing the control process; and an output section outputting to the regulator a shaped target value signal which is shaped by the target value shaping unit. The target value processing unit realizes the high-level control process without improving the regulator.

18 Claims, 12 Drawing Sheets

Fig. 5
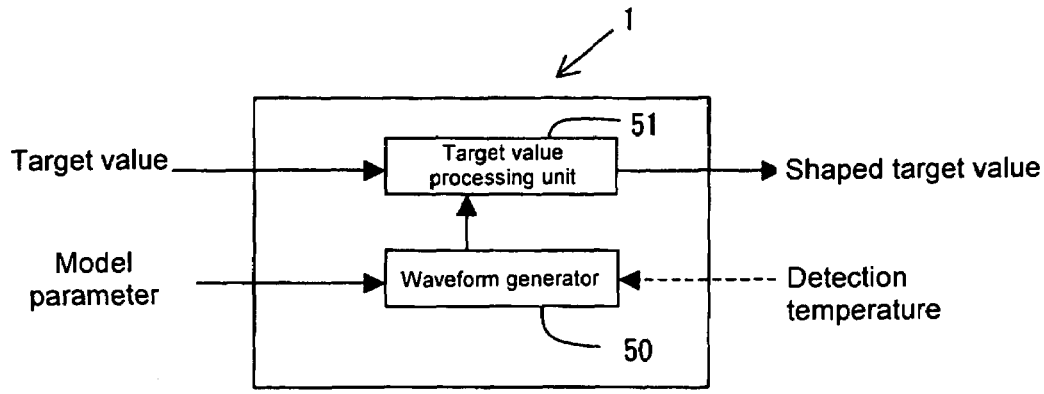
Fig. 6
| Time | ch0 | ch1 | · · · | chn |
|------|-----|-----|-------|-----|
| 0    | 0°C | 0°C | · · · | 0°C |
| 0.1  | 0.1°C | 0.3°C | · · · | 0.2°C |
| 0.2  | 0.5°C | 0.4°C | · · · | 0.2°C |
| .    | .   | .   |       | .   |
| .    | .   | .   |       | .   |
| .    | .   | .   |       | .   |
Fig. 7
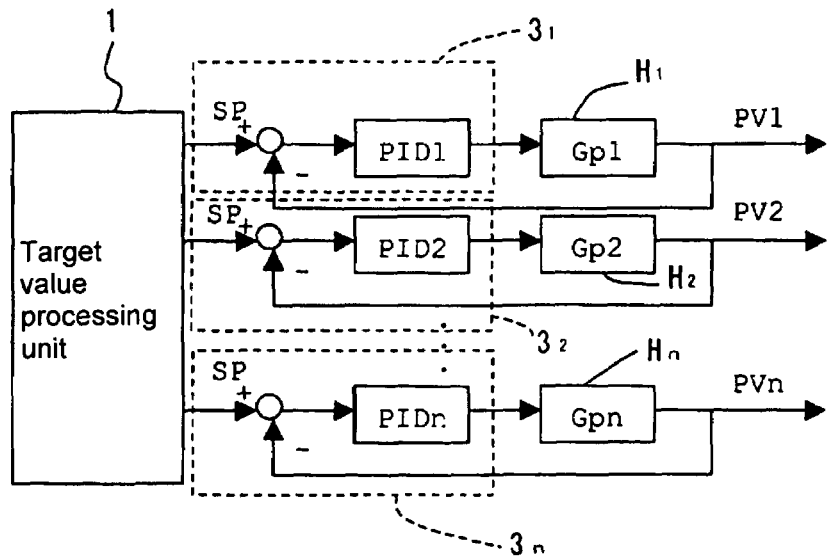

| ch | a1 | a2 | ... | am | b1 | ...bm |
|---|---|---|---|---|---|---|
| 0 | 0.91 | 0.80 | ... | 0.22 | 0.94 | ..... |
| 1 | 0.98 | 0.89 | ... | 0.32 | 0.87 | ..... |
| 2 | 0.86 | 0.91 | ... | 0.18 | 0.95 | ..... |
| . | . | . |  | . | . |  |
| . | . | . |  | . | . |  |
| . | . | . |  | . | . |  |
| n | 0.90 | 0.88 | ... | 0.52 | 0.92 | ..... |

| Ch | T1 | T2 | ... | Tm | L1 | ...Lm |
|---|---|---|---|---|---|---|
| 0 | 103 | 220 | ... | 10 | 2 | ..... |
| 1 | 121 | 160 | ... | 14 | 5 | ..... |
| 2 | 130 | 90 | ... | 21 | 3 | ..... |
| . | . | . |  | . |  |  |
| . | . | . |  | . |  |  |
| . | . | . |  | . |  |  |
| n | 210 | 101 | ... | 16 | 4 | ..... |

Target value

Detection
temperature

TARGET VALUE PROCESSING UNIT, TEMPERATURE CONTROLLER, CONTROL PROCESS IMPLEMENTING SYSTEM, PROCESS CONTROLLING METHOD, TARGET VALUE PROCESSING PROGRAM, AND RECORDING MEDIUM

BACKGROUND OF THE INVENTION

1. Field of the Invention

The present invention relates to a technology implementing a control process with a regulator by using a target value signal showing a control target value of the control process.

Examples of the regulator include a temperature controller fitted to a heat system. The temperature controller measures heat temperature of the heat system, and controls the heat system's operation such that the thus measured temperature becomes a predetermined target value.

2. Description of the Related Art

As disclosed in Japanese Patent Publication No. 2,861,276, conventionally, for increasing control accuracy by the temperature controller, a target value to be inputted to the temperature controller is shaped by the temperature controller, to thereby implement the control process.

With a structure of the conventional regulator, remodeling (including software structure) of a unit structure of the regulator is necessary for improving the control accuracy, failing to improve the control accuracy by the unit structure as is.

In addition, a control object (temperature keeping system and the like) causing a complicated interference may require per-regulator betterment which is proper for the regulator setting environment, and the bettering operation may require a technical skill. For example, even the same type of temperature controllers may have various models and functions. For implementing with high accuracy the betterment of unit structure which is proper for the above various models and functions, a very high-level technical skill is necessary.

Moreover, even when the above betterment is completed, this betterment has no choice but to be applied individually to the setting environment. Therefore, the thus bettered regulator, when having a failure, cannot be rapidly replaced with another unit having the same function.

SUMMARY OF THE INVENTION

In view of the above, it is therefore an object of the present invention to provide a regulator that has an improved control accuracy, with a unit structure thereof as is.

Under the present invention, the following structure is disclosed for accomplishing the above object.

According to a first aspect of the present invention, there is provided a target value processing unit which includes: an input section to which a target value signal showing a target value of a control process is inputted; a target value shaping unit shaping the target value signal inputted to the input section, into a signal form which is proper for a control treatment of a regulator implementing the control process; and an output section outputting to the regulator a shaped target value signal which is shaped by the target value shaping unit.

Herein, the target value signal does not need to be continuously inputted, but can be inputted when necessary. Otherwise, the target value signal may be kept set by input.

Moreover, the signal form proper for control treatment is defined as a signal form which is proper for implementing a desired control, examples of the signal form including those for controls such as i) a control suppressing an overshoot or an undershoot, ii) a rapid response control, iii) a hunching-suppressing control, and iv) a control suppressing variation between a multiplicity of channels.

The shaped target value signal may be any of the following: i) a target value signal which is shaped and memorized in advance, ii) a target value signal which is processed by a processing signal, specifically, a target value signal that is added, subtracted or multiplied by the processing signal, iii) a target value signal which is obtained by switching a) the target value signal with b) a target value signal shaped-memorized in advance, and iv) a target value signal generated by using a model and the like.

The regulator may be what-is-called a multi-channel regulator capable of controlling a multiplicity of channels, or may be one or a multiplicity of regulators controlling only one channel.

In other words, the target value processing unit may shape the target value signal of only one channel, or shape the target value signals of a multiplicity of channels.

Under the present invention, before the regulator, the target value processing unit shapes the target value signal into a signal form which is proper for the control treatment, thereafter, the thus shaped target value signal is given to the regulator, thereby allowing the regulator as is to improve control accuracy without bettering the regulator.

According to an embodiment, there is provided at least one of a coupler for detachably coupling the target value processing unit to the regulator, and a communicating member for communicatively connecting the target value processing unit with the regulator.

Herein, the coupler is not limited to a connector, and therefore a cable and the like are replaceable.

Moreover, the communicating member denotes, for example, a wireless communicating section which is disposed at each of the target value processing unit and the regulator.

According to this embodiment, the target value processing unit can be united with the regulator for handling or a wireless communication is enabled, improving convenience.

In this case, more preferably, the output section is so structured as to be detachably electrically connected to the target value input section of the regulator, by the coupler which makes a mounting-dismounting operation of the target value processing unit and the regulator. With the above structure, the output section can be easily connected to the target value input section of the regulator, further improving convenience.

According to preferred embodiments, there is also provided a memory unit memorizing in advance a shaped pattern of the target value. The target value shaping unit shapes the target value signal inputted to the input section, based on the shaped pattern memorized in the memory unit.

Herein, the shaped pattern is defined as a pattern for shaping the target value signal, examples thereof including data such as i) a waveform pattern changeable with an elapsed time and ii) a table showing time relative to a target value (or a correction value for correcting the target value).

According to this embodiment, based on the same shaped pattern memorized in the memory unit, repeated implementations (shapings) of the target value signal are enabled with high accuracy.

According to the embodiment, the target value shaping unit shapes the target value signal inputted to the input section, such that an observation quantity of a control object controlled with the regulator reaches rapidly to the target value.

Herein, the observation quantity is defined as a feedback quantity from the control object to the regulator which controls the control object, examples thereof including a detection signal from a sensor sensing a physical state of the control object, more specifically, a detection signal from a temperature sensor for sensing a temperature of the control object in the controlling of the control object's temperature.

Moreover, the term "rapid (or rapidly)" is so defined that the observation quantity reaches the target value faster than when the target signal is not shaped.

According to this embodiment, the regulator as is can implement a rapid-response control.

According to another embodiment, in a period when the observation quantity causes at least one of an overshoot and an undershoot, the target value processing unit shapes the target value signal such that a peak value of the observation quantity causing at least one of the overshoot and the undershoot becomes the target value.

According to this embodiment, the target value processing unit may shape the target value signal when the overshoot or the undershoot is caused with the target value signal not shaped. Therefore, the regulator as is can suppress the overshoot or the undershoot.

According to the embodiment, the target value shaping unit takes the following operations: taking in an observation quantity of a control object which is controlled with the regulator in a state where an unshaped target value signal is supplied in advance to the regulator, and making the shaped pattern of the target value and memorizing the shaped pattern of the target value in the memory unit, such that the thus taken-in observation quantity rapidly reaches the target value. In the target value shape control, the target value shaping unit reads out the shaped pattern from the memory unit to thereby implement the shaping of the target value signal.

According to this embodiment, the regulator as is can implement a rapid-response control.

Alternatively, according to another embodiment, instead of making the shaped pattern by the target value processing unit, making otherwise the shaped pattern of the target value in advance such that the observation quantity can rapidly reach the target value, and memorizing the shaped pattern in the memory unit of the target value processing unit is allowed.

According to another embodiment, the target value shaping unit takes in in advance the observation quantity which is obtained when a disturbance is applied, and the target value shaping unit makes the shaped pattern of the target value such that an influence by the disturbance is rapidly extinguished from the thus taken-in observation quantity, to thereby memorize the shaped pattern in the memory unit.

According to this embodiment, the regulator as is can implement a control with the disturbance response improved.

According to the preferred embodiments, the regulator has a limiter for limiting a control process operation quantity to be outputted to the control object, and the target value shaping unit takes in a differential output between the control process operation quantity inputted to the limiter and the control process operation quantity outputted from the limiter, and shapes the target value signal such that the thus taken-in differential output is rapidly extinguished.

Herein, the term "rapid (or rapidly)" is so defined that the speed is faster than when the target signal is not shaped.

According to this embodiment, so shaping the target value signal that a saturation quantity of the control process operation quantity is deleted allows the regulator as is to be usable for reset windup measure.

According to the preferred embodiments, the target value processing unit further includes: a waveform generator for generating a waveform based on a parameter to be set, and a processing unit for processing the target value signal to be outputted as the shaped target value signal, based on the waveform generated by the waveform generator.

Herein, the parameter is defined as data for generating a waveform with the waveform generator, examples thereof including i) data showing time relative to target value, ii) a parameter specifying a model such as ARX model, and iii) change width of the target value.

This parameter is to be predetermined such that a desired shaped target value signal can be obtained. Examples of the desired shaped target value signal include shaped target value signals which are proper for desired controls such as i) a control suppressing an overshoot or an undershoot, ii) a rapid response control, iii) a hunching-suppressing control, and iv) a control suppressing variation between a multiplicity of channels. For predetermining this parameter, measuring the observation quantity of the control object which is controlled with the regulator in a state where an unshaped target value signal is supplied in advance to the regulator is preferred.

The parameter may be set, for example, by a communication from a personal computer, a PLC (programmable-logic-controller) and the like. Otherwise, an operator may directly input the setting.

The waveform generator generates a waveform according to the parameter to be set. More specifically, according to the parameter, the waveform generator generates i) the target value's waveform which is changeable with an elapsed time, ii) a waveform using a model such as ARX model, and iii) a waveform which is changeable at a width determined over a predetermined period.

To this waveform generator, a timing signal specifying a waveform-generating timing may be inputted. Alternatively, to this waveform generator, an observation quantity from the control object may be so given that change of this observation quantity specifies the waveform-generating timing.

The processing is defined as shape-processing of the target value signal by the waveform from the waveform generator, examples thereof including operations such as addition, subtraction, and multiplication of i) target value signal and ii) waveform from waveform generator, and switching of i) target value signal and ii) waveform from the waveform generator.

According to this embodiment, with a predetermined parameter set in advance, the waveform from the waveform generator may shape the target value signal to thereby give to the regulator the thus shaped target value signal. With this, the regulator as is can implement desired controls such as i) a control suppressing an overshoot or an undershoot, ii) a rapid response control, iii) a hunching-suppressing control, and iv) a control suppressing variation between a multiplicity of channels, to thereby improve control accuracy.

According to another embodiment, the target value processing unit further includes: i) a parameter generator for generating a parameter by taking in the following: an observation quantity of a control object which is controlled with the regulator in a state where an unshaped target value signal is supplied in advance to the regulator, and an observation quantity of a control object which is controlled with the regulator in a state where a predetermined target value signal is supplied to the regulator, ii) a waveform generator for generating a waveform based on the parameter generated by the parameter generator, and iii) a processing unit for processing the target value signal to be outputted as the shaped target value signal, based on the waveform generated by the waveform generator.

Herein, the predetermined target value signal is used for generating the parameter, examples thereof including a target value signal which is changeable stepwise by a predetermined quantity, and a target value signal which is changeable in a pulse form by a predetermined quantity, specifically, in the case of temperature control, a target value signal which is changeable stepwise by 1° C.

Changing the target value signal, for example, stepwise by 1° C. by taking in the observation quantity of the control object which is controlled with the regulator in a state where the predetermined target value signal is supplied to the regulator can determine at which time point and by what degree the observation quantity changes based on the time point which changed the target value signal.

Meanwhile, when the target value signal is not shaped by taking in the observation quantity of the control object which is controlled with the regulator in a state where the unshaped target value signal is supplied in advance to the regulator, at which time point and by what degree the observation quantity is undesirably changed can be determined. More specifically, at which time point and by what degree the observation quantity is undesirably changed by the disturbance can be determined.

Therefore, based on the change of the observation quantity relative to the predetermined target value signal, and on the change of the observation quantity with the target value not shaped, the undesirable change of the observation quantity can be suppressed. Specifically, for implementing the desired control, at which timing and by what degree the target value signal needs to be processed can be determined. With this, the parameter (for example, data showing time relative to target value, as described above) for changing the observation quantity at a required timing and by a required quantity can be generated.

In this manner, based on: i) the observation quantity of the control object which is controlled with the regulator in a state where the unshaped target value signal is supplied to the regulator, and ii) the observation quantity of the control object which is controlled with the regulator in a state where the predetermined target value signal is supplied to the regulator, the parameter generator may generate the parameter for processing the target value.

Herein, the observation quantity of the control object which is controlled with the regulator in a state where the unshaped target value signal is supplied in advance to the regulator, and the observation quantity of the control object which is controlled with the regulator in a state where the predetermined target value signal is supplied to the regulator, do not need to be measured actually. For example, a model and the like may be used for estimating the observation quantity.

According to this embodiment, the regulator as is can implement the desired control.

According to the embodiment, the target value processing unit further includes: a saturation quantity forecaster for forecasting a saturation quantity of the control process operation quantity of the regulator, and a processing unit for processing the target value signal (SPp) based on the saturation quantity forecasted by the saturation quantity forecaster in such a manner as to eliminate the forecasted saturation quantity and then output the thus processed target value signal as the shaped target value signal.

The forecasted saturation quantity is preferred to be feedbacked to the processing unit via a feedback element which is capable of variably setting the gain.

According to this embodiment, before the regulator implements the treatment for the reset windup measure, the target value processing unit can implement the treatment for the reset windup measure based on the forecasted saturation quantity. Therefore, compared with the regulator as is, the target value processing unit can implement a more preferred reset windup measure.

According to a second aspect of the present invention, there is provided a temperature controller which includes: a target value input section to which the shaped target value signal outputted from the output section of the target value processing unit is inputted.

Under the present invention, the temperature controller as is can improve accuracy of temperature control.

According to a third aspect of the present invention, there is provided a control process implementing system which includes: a target value supplying unit for generating a target value signal showing a target value of a control process; the target value processing unit as claimed in any of claim 1 to claim 12 which shapes a target value signal generated by the target value supplying unit; and a regulator implementing a control process based on a shaped target value signal shaped by the target value processing unit.

The target value supplying unit may set the above parameter or generate the parameter, alternatively, may give to the target value processing unit the timing signal for the target value processing.

Under the present invention, the regulator as is can improve the control accuracy.

According to a fourth aspect of the present invention, there is provided a process controlling method which includes: a target value supplying step of generating a target value signal showing a target value of a control process; a target value processing step of shaping the thus generated target value signal into a signal form which is proper for a control treatment in implementing the control process; and a control process implementing step of implementing the control process based on the thus shaped target value signal.

Under the present invention, the regulator as is implementing the control process can improve the control accuracy.

According to a fifth aspect of the present invention, there is provided a target value processing program which shapes a target value signal showing a target value of a control process into a signal form which is proper for a control treatment of a regulator implementing the control process. The target value processing program allows a computer to implement the following: a step of generating a waveform based on a set parameter; and a step of processing the target value signal to be outputted to the regulator, based on the thus generated waveform.

Under the present invention, the computer implementing the target value processing program allows the regulator as is to improve control accuracy.

According to a sixth aspect of the present invention, there is provided a recording medium which is readable in a computer where the target value processing program under the present invention is recorded.

Herein, examples of the recording medium include a flexible disk, a hard disk, an optical disk, an optical-magnetic disk, a CD-ROM, a magnetic tape, a nonvolatile memory card, a ROM and the like.

Specifically, the target value processing program which is made to function as the target value processing unit under the present invention can be constructed as what-is-called a package software.

The recording medium reading in the target value processing program under the present invention and the computer implementing the thus read-in target value processing program allow the regulator as is to improve the control accuracy.

Adding the target value processing unit under the present invention to the unit structure as is, for example, a general-purpose comparatively low-cost regulator as is can improve the control accuracy, thus suppressing (or minimizing) labor and cost for bettering the system.

The per-regulator betterment which is proper for the regulator setting environment is not needed at all. Bettering the regulator is so often in need of technical skill. Under the present invention, however, the unnecessary technical skill may work for further suppressing the labor and cost for bettering the system.

Even when the target value processing unit is in failure, replacing the thus failed target value processing unit with a same functional unit is sufficient, allowing the regulator as is to be usable continuously. Therefore, recovery from the failure can be accomplished promptly at a low cost.

Additional objects and advantages of the present invention will be apparent from the following detailed description of preferred embodiments thereof, which are best understood with reference to the accompanying drawings.

BRIEF DESCRIPTION OF THE DRAWINGS

FIG. 5 shows a functional block diagram of the target value processing unit, according to the embodiment.

FIG. 6 shows an example of a model parameter.

FIG. 7 shows a structure of a multiplicity of channels.

DESCRIPTION OF THE PREFERRED EMBODIMENTS

Hereinafter, a target value processing unit for shaping a target value which is supplied to a temperature controller is to be described, according to embodiments of the present invention.

Examples of the temperature controller include one used for temperature control of a heater which heats a temperature of a semiconductor wafer in a CVD (Chemical Vapor Deposition) treatment to a predetermined temperature, when using a CVD unit for making various functional films on the semiconductor wafer by a CVD method.

Figure 1:
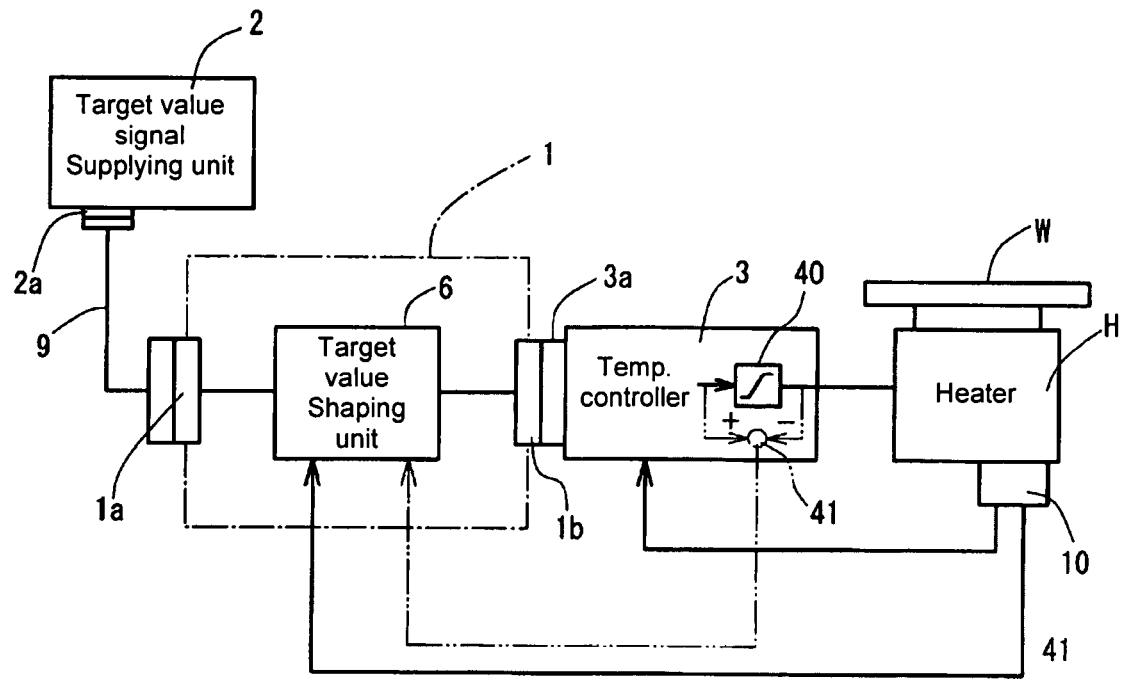
FIG. 1 shows a block diagram showing an entire structure including a target value processing unit, a temperature controller, a target value signal supplying unit, and a heater, according to an embodiment of the present invention.
Figure 2:
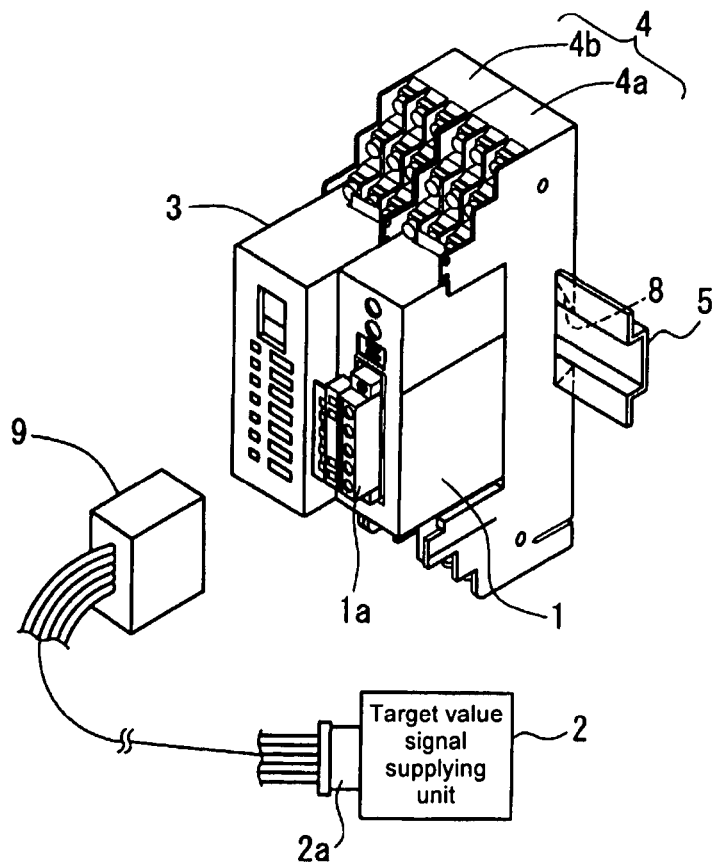
FIG. 2 shows an external perspective view showing a state where the target value processing unit and the temperature controller according to the embodiment are coupled via a terminal bench.
Figure 3:
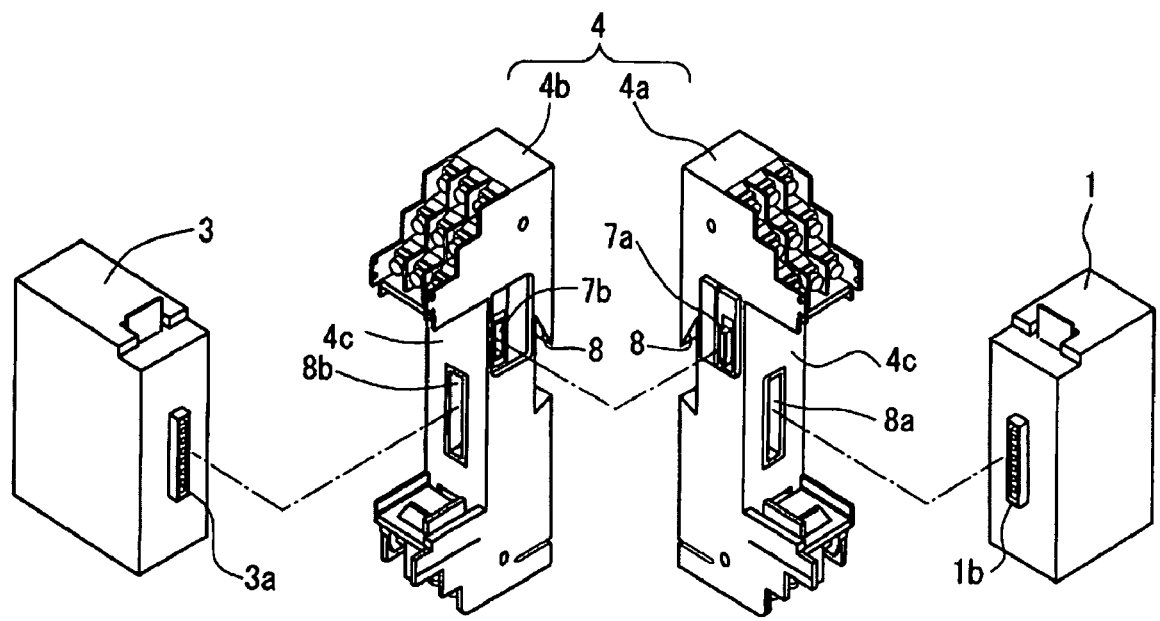
FIG. 3 shows an exploded perspective view showing a state where the target value processing unit and the temperature controller according to the embodiment are coupled via the terminal bench.

FIG. 1 is a block diagram showing an entire structure of a control process implementing system including a target value processing unit, according to an embodiment of the present invention. FIG. 2 is an external perspective view showing a state where the target value processing unit and the temperature controller are coupled. FIG. 3 is an exploded perspective view showing a state where the target value processing unit and the temperature controller are coupled.

In FIG. 1, FIG. 2 and FIG. 3, there are provided a target value processing unit 1, a target value signal supplying unit 2, a temperature controller 3, a terminal bench 4, a couple rail 5, a heater H, a heat object W and a temperature sensor 10 (sensing unit).

At first, a functional structure of the target value processing unit 1, the target value signal supplying unit 2, and the temperature controller 3 is to be explained.

The target value signal supplying unit 2 is provided with an output section 2a which outputs a target value signal showing a set temperature becoming a control target value of the temperature controller 3.

Herein, the target value signal supplying unit 2 is constructed, for example, with a personal computer, PLC (programmable-logic-controller) and the like. In addition to the target value signal corresponding to the set temperature of the temperature controller 3, when necessary, the target value signal supplying unit 2 may output to the target value processing unit 1, for example, a timing signal and the like for the target value process control.

The target value processing unit 1 is provided with a target value shaping unit 6, an input section 1a and an output section 1b. The target value signal inputted through the input section 1a is outputted as a shaped target value signal from the output section 1b, after the target value shaping unit 6 shapes the target value signal into a signal form which is proper for control treatment of the temperature controller 3. The input section 1a electrically connects to the output section 2a of the target value signal supplying unit 2 via a connector cable 9.

The temperature controller 3 is provided with a target value input section 3a, and controls a heat temperature by the heater H based on the shaped target value signal which is inputted from the target value input section 3a. Namely, the temperature controller 3 implements temperature control by using the shaped target value signal as a target value (set temperature).

The heat object W (such as semiconductor wafer) is heated with the heater H. The temperature sensor 10 may detect a temperature state of the heater H, more specifically, a temperature state of a heat treatment disk as a control object where the heater H is disposed, to thereby supply a sensing result (temperature information) to the temperature controller 3 and the target value shaping unit 6.

Then, a structure of the target value processing unit 1, the target value signal supplying unit 2, and the temperature controller 3 is to be explained.

The target value processing unit 1 has an external configuration shaped into a box, with a front face thereof having the input section 1a, and a back face thereof having the output section 1b. The input section 1a and the output section 1b are each shaped into a terminal. The target value processing unit 1 has an inner section where the target value shaping unit 6 is stored. The target value shaping unit 6 in the target value processing unit 1 is electrically connected to the input section 1a on the front face of the target value processing unit 1 via an inner wire (not shown) of the target value processing unit 1. Likewise, the target value shaping unit 6 is electrically connected to the output section 1b via an inner wire (not shown) of the target value processing unit 1.

Like the target value processing unit 1, the temperature controller 3 has an external configuration shaped into a box. On a back face of the temperature controller 3, there is provided a target value input section 3a shaped into a terminal. A body in the temperature controller 3 is electrically connected to the target value input section 3a on a back face of the temperature controller 3 via an inner wire (not shown) of the temperature controller 3.

The terminal bench 4 has a terminal bench section 4a for the target value processing unit 1, and a terminal bench section 4b for the temperature controller 3. The terminal bench section 4a and the terminal bench section 4b are detachably coupled, with side faces thereof abutting on each other. Specific structure thereof is described below.

The side faces of the terminal bench sections 4a, 4b are respectively provided with side connectors 7a, 7b. The side connectors 7a, 7b are electrically connected with each other detachably, forming a terminal structure. The terminal bench sections 4a, 4b have front faces which are respectively provided with bench seats 4c, 4c. The bench seats 4c, 4c are so constructed that a back face section of the target value processing unit 1 and a back face section of the temperature controller 3 are detachably fitted respectively. The bench seats 4c, 4c have base sections which are respectively provided with connector terminals 8a, 8b. The connector terminals 8a, 8b are for electrical connection with the respective target value processing unit 1 and temperature controller 3. In the terminal bench section 4a, the connector terminal 8a is electrically connected to the side connector 7a via an inner wire (not shown) of the terminal bench section 4a. Likewise, in the terminal bench section 4b, the connector terminal 8b is electrically connected to the side connector 7b via an inner wire (not shown) of the terminal bench section 4b.

The terminal bench sections 4a, 4b have back faces which are respectively formed with rail engaging grooves 8, 8. The rail engaging grooves 8, 8 are so formed as to cover both ends (left and right) of the respective back faces of the terminal bench sections 4a, 4b. The rail engaging groove 8 is so formed that the couple rail 5 is engaged therewith. The terminal bench sections 4a, 4b may be mechanically coupled with each other via the same couple rail 5 that is inserted into the engaging grooves 8, 8. Moreover, the terminal bench sections 4a, 4b couple the respective side connectors 7a, 7b, with the side faces thereof abutting on each other in a state where the terminal bench sections 4a, 4b are coupled via the couple rail 5. With this, the connector terminals 8a, 8b may be electrically connected with each other via the thus coupled side connectors 7a, 7b. The terminal bench 4 including the thus coupled terminal bench sections 4a, 4b may function as a coupler of the target value processing unit 1 and the temperature controller 3.

Herein, not limited to a coupler such as the side connectors 7a, 7b and the like, a communication cable may be used for the connection, or wireless communicating sections enabling wireless communication of the target value processing unit 1 and the temperature controller 3 may be provided respectively.

The back face of the target value processing unit 1 is detachably fitted to the bench seat 4c of the terminal bench section 4a. In this fitted state, the output section 1b of the target value processing unit 1 mates with the connector terminal 8a at a base section of the bench seat 4c, thereby electrically connecting the output section 1b with the connector terminal 8a. Likewise, the back face of the temperature controller 3 is detachably fitted to the bench seat 4c of the terminal bench section 4b. In this fitted state, the target value input section 3a of the temperature controller 3 mates with the connector terminal 8b at a base section of the bench seat 4c, thereby electrically connecting the target value input section 3a with the connector terminal 8b. Providing the above coupling structure can mechanically couple the target value processing unit 1 with the temperature controller 3 via the terminal bench 4 and accomplish the electrical connection therebetween.

Figure 4:
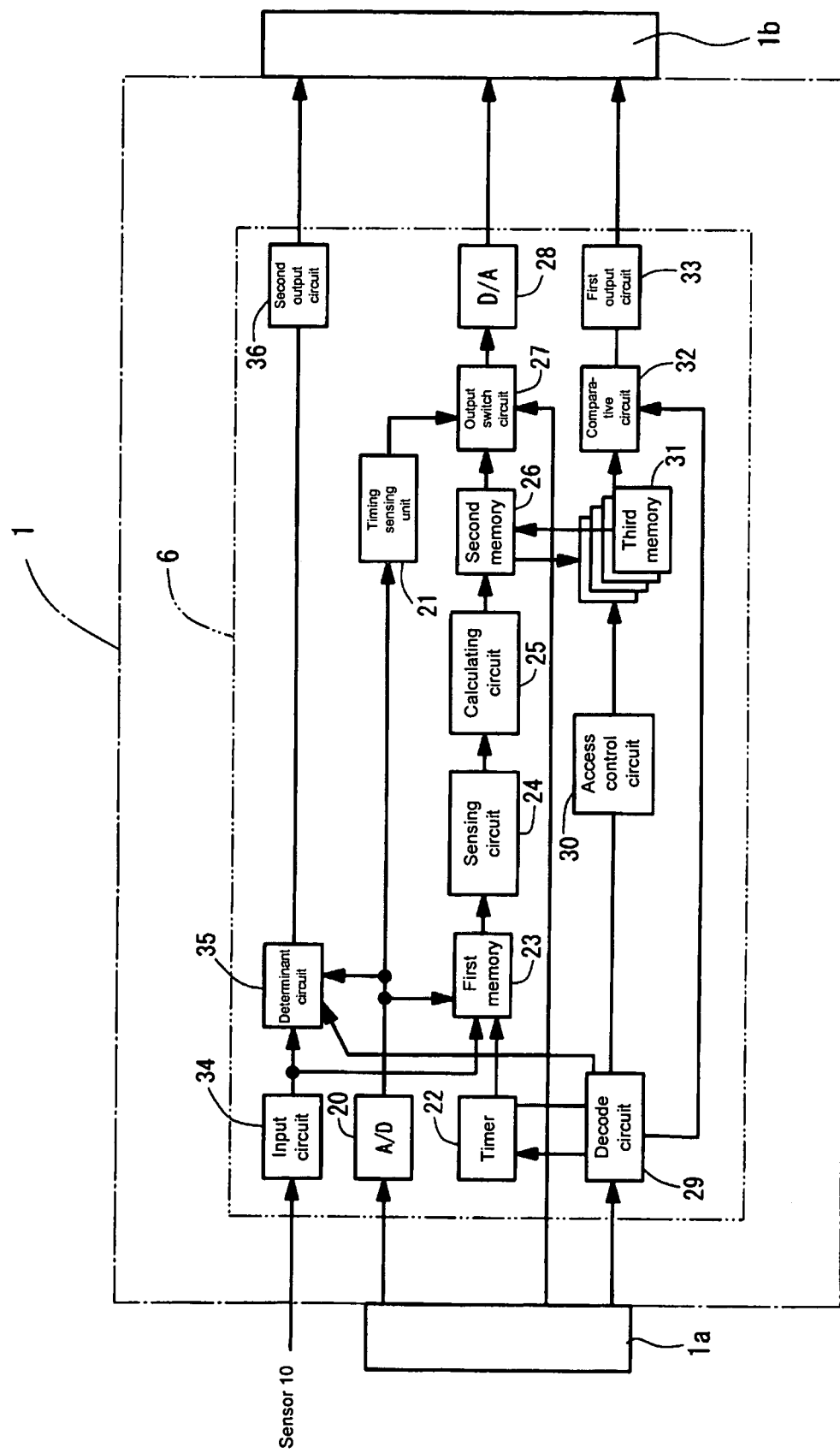
FIG. 4 shows a block diagram showing a structure of the target value processing unit, according to the embodiment.

Hereinafter described referring to FIG. 4 is a detailed example of the structure of the target value processing unit 1 and of the target value shaping unit 6 disposed in the target value processing unit 1.

According to this embodiment, the target value shaping unit 6 is provided with an A/D converting circuit 20, a timing sensing circuit 21, a timer 22, a first memory 23, a sensing circuit 24, a calculating circuit 25, a second memory 26, an output switch circuit 27, a D/A converting circuit 28, a decode circuit 29, an access control circuit 30, a third memory 31, a comparative circuit 32, a first output circuit 33, an input circuit 34, a determinant circuit 35, and a second output circuit 36.

The A/D converting circuit 20 converts into a digital signal a target value signal (analog) which is inputted from the target value signal supplying unit 2 via the input section 1a, to thereafter output the thus converted digital signal to the timing sensing circuit 21, the first memory 23 and the determinant circuit 35.

The timing sensing circuit 21 may sense a timing (for starting target value response control) when the target value signal is inputted. At a time point when the timer 22 supplies a memory timing order to the first memory 23, the first memory 23 memorizes i) the heater H's heat temperature detection signal supplied from the temperature sensor 10 via the input circuit 34, and ii) the target value signal (digital) outputted from the A/D converting circuit 20. The determinant circuit 35 may compare the temperature detection signal memorized in the first memory 23 with the target value signal (digital), to thereby determine whether the heater H's temperature is abnormally high/low relative to the target value. With the determination result "ABNORMAL," the determinant circuit 35 may generate an abnormal-state cutoff signal for cutting off energization to the heater H. The second output circuit 36 may output the abnormal-state cutoff signal to the temperature controller 3.

The temperature controller 3 receiving the abnormal-state cutoff signal may stop energization to the heater H.

Based on the temperature detection signal and the target value signal (digital) which are memorized in the first memory 23, the sensing circuit 24 may sense signal change modes of signal level change in time series change of the temperature detection signal, examples of the modes including i) a generation period, ii) a generation timing, iii) a generation amplitude, and the like.

Based on the signal change mode sensed by the sensing circuit 24, the calculating circuit 25 may shape the target value signal.

Herein, the shaped target value signal may be formed, for example, as a signal pattern (shaped pattern) which causes the level change along time series. The shaped target value signal may be memorized in one memory area of the third memory 31 via the second memory 26. Herein, shaped target value signals corresponding respectively to a multiplicity of the heat objects W having heat capacities different from each other due to scale, material and the like may be generated, and memorized in respective memory areas of the third memory 31. Being made in advance, the shaped target value signal may be memorized in the memory area of the third memory 31.

Alternatively, according to another embodiment, instead of memorizing the shaped target value signal, a processing signal for processing the target value signal into the shaped target value signal is memorized. Then, processing the processing signal and the inputted target value signal into the shaped target value signal to be outputted is allowed. More specifically, adding the processing signal and the target value signal for outputting as the shaped target value signal is allowed.

The output switch circuit 27 makes a switching between the shaped target value signal stored in the second memory 26 and the target value signal (digital) supplied from the target value signal supplying unit 2 via the A/D converting circuit 20, to thereby output the thus switched signal. The D/A converting circuit 28 may convert, into analog, the target value signal or the shaped target value signal outputted from the output switch circuit 27, to thereby output the thus converted signal to the temperature controller 3.

From a multiplicity of order signals supplied from the target value signal supplying unit 2 and the like, the decode circuit 29 may extract a specific order which specifies an arbitrary shaped target value signal.

The access control circuit 30 may implement such a control as to read out from the third memory 31 the shaped target value signal specified by the specific signal (Load order) extracted by the decode circuit 29, to thereafter write out the thus read signal to the second memory 26. The comparative circuit 32 may compare each shaped target value signal memorized in the third memory 31 with a predetermined comparative value. When each shaped target value signal exceeds the comparative value, the comparative circuit 32 determines that the shaped target value signal has an abnormal characteristic fluctuation, to thereby make a characteristic fluctuation notice signal. The characteristic fluctuation notice signal may be outputted from the first output circuit 33 to the temperature controller 3. The temperature controller 3 receiving the characteristic fluctuation notice signal may make a fluctuation alarm alarming that the abnormal characteristic fluctuation is caused to the shaped target value signal. The fluctuation alarm may be of display mode and sound-voice generation mode.

FIG. 5 is a functional block diagram showing a basic structure of the target value processing unit 1.

The target value processing unit 1 according to this embodiment is, basically, provided with i) a waveform generator 50 generating a processing waveform and ii) a target value processing unit 51 processing the target value signal which is inputted from the target value signal supplying unit 2 by the processing waveform from the waveform generator 50.

Based on i) information necessary for generating the processing waveform (hereinafter referred to as "model parameter") and, when necessary, ii) detection temperature and timing signal from the temperature sensor 10, the waveform generator 50 may generate the processing waveform to thereby give the thus generated processing waveform to the target value processing unit 51. Using the waveform from the waveform generator 50, the target value processing unit 51 may implement processing {for example, addition or other operation(s)} on the target value signal inputted from the target value signal supplying unit 2, to thereby output to the temperature controller 3 the thus processed signal as a shaped target value signal.

Examples of the model parameter for generating the processing waveform by the waveform generator 50 are described below.

Specifically, as the model parameter, FIG. 6 shows a temperature table showing time relative to temperature. In a temperature control of a multiplicity of channels as shown in FIG. 7, this temperature table shows time and temperature corresponding individually to the temperature controllers $3_1$ to $3_n$ of each of channels ($ch_0$ to $ch_n$).

Figures 8, 9, 10:
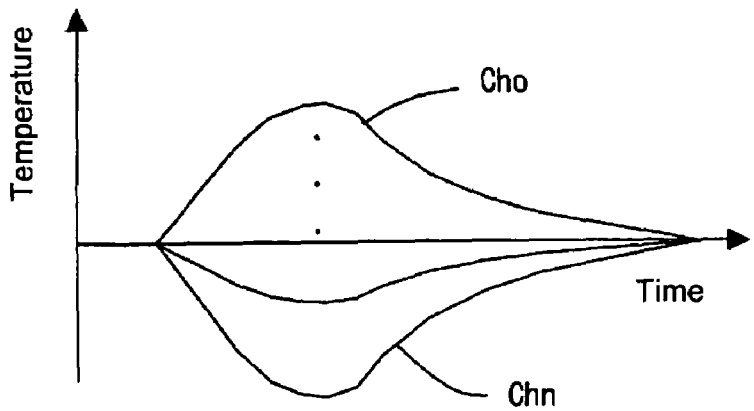
FIG. 8 shows another example of the model parameter.
FIG. 9 shows still another of the model parameter.
FIG. 10 shows still another example of the model parameter.

Alternatively, FIG. 8 shows a model parameter which is a waveform (graph) showing temperature change relative to time of each of the channels ($ch_0$ to $ch_n$).

Herein, the above waveforms may be memorized in advance, for example, in the second memory 26, the third memory 31 and the like in FIG. 4.

Moreover, as shown in FIG. 9, ARX model's parameters (denominators a1 to am and numerators $b_1$ to $b_m$) corresponding individually to each of the channels ($ch_0$ to $ch_n$) may be used as the model parameter.

Moreover, as shown in FIG. 10, time constants T1 to Tm and dead times L1 to Lm of the model of each of the channels ($ch_0$ to $ch_n$) including time constant T and dead time L may be used as the model parameter.

In FIG. 9 and FIG. 10, in response to an input such as pulse signal, the waveform is outputted using the model specified by the model parameter.

The above model parameters may be predetermined, for example, in the following manner.

Specifically, in a state where the target value is not processed in advance, a temperature control is to be implemented to thereby measure how the detection temperature of the control object changes. Moreover, the temperature change of the control object when, for example, the target value is changed in a pulse form by a standard quantity is to be measured.

Figure 11A:
FIG. 11 shows a method of determining the model parameter.
Figure 11B:
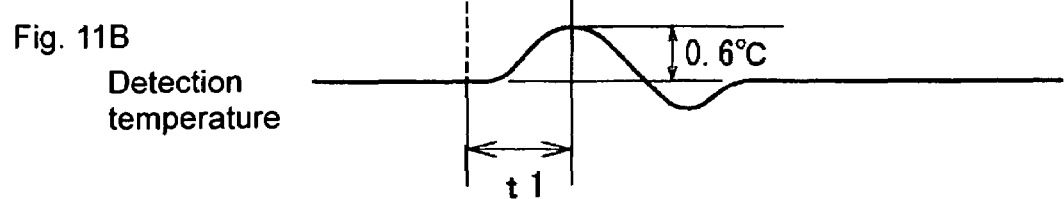

For example, as shown in FIG. 11A, the target value (set temperature) is changed in a pulse form by 1° C., while FIG. 11B shows measurement of detection temperature of the control object in the above case.

Based on measurement data in FIG. 11, the following time t1 and ratio can be determined:

time t1: from a first time point changing the target value, to a second time point (for example, a peak time point of the control object's temperature), and ratio: temperature change at the peak time point of the control object's temperature relative to temperature change 1° C. of the target value, for example, a ratio of 0.6° C.

Therefore, based on the timing and ratio of the above temperature change, and in a state where the target value is not processed, making the control object's detection temperature measured by temperature control into a desired temperature at a desired timing can calculate at which timing and by what ° C. the target value be changed, to thereby determine the above model parameter.

In this manner, generating the waveform by using the model parameter and processing the target value, namely, changing the target value at a required timing by a required temperature may correct the control object's detection temperature to a desired temperature at a desired timing, thereby causing such effects as suppressing an overshoot and an undershoot, and suppressing variation of temperature between channels for unification.

Figure 12:
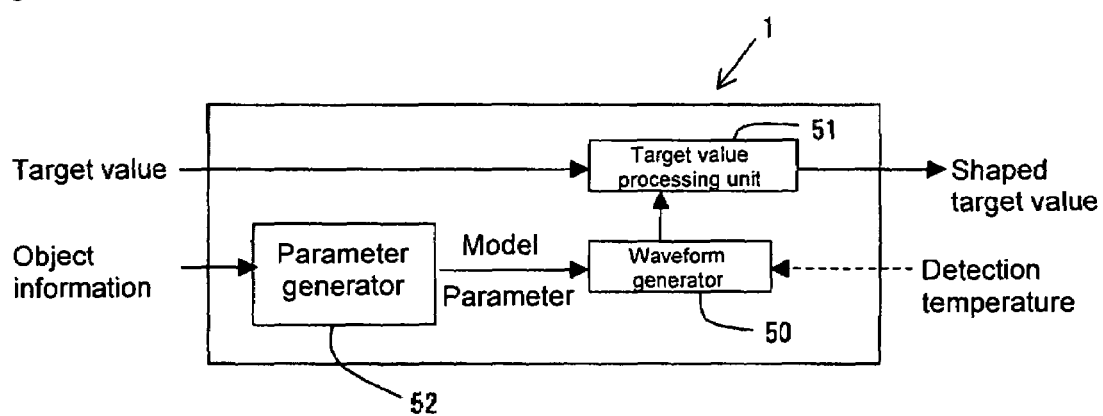
FIG. 12 shows a functional block diagram showing a target value processing unit, according to another embodiment.

FIG. 12 is a functional block diagram of a target value processing unit 1, according to another embodiment.

According to the embodiment in FIG. 5, the model parameter is predetermined, and this model parameter is set to the target value processing unit 1. According to this embodiment in FIG. 12, the target value processing unit 1 is provided with: i) the parameter generator 52 generating the model parameter as described above, based on object information such as: a) the control object's detection temperature which is measured in a temperature controlled state where the target value is not processed, and b) the control object's detection temperature which is measured when the target value is changed, for example, stepwise by a standard quantity, ii) the waveform generator 50 generating the processing waveform as described above, based on the model parameter from the parameter generator 52, and iii) the target value processing unit 51 processing the target value signal set from the target value signal supplying unit 2, by using the processing waveform from the waveform generator 50. In FIG. 4, the parameter generator 52 can be constructed with the sensing circuit 24, the calculating circuit 25 and the like.

According to this embodiment, after taking the following operations, the model parameter for generating the processing waveform may be calculated to thereby give the thus calculated model parameter to the waveform generator 50: i) for example: a) inputting the measurement data of the control object's detection temperature in a temperature controlled state where the target value processing is not implemented, and b) inputting the measurement data of the control object's detection temperature in a state where the target value is changed, for example, stepwise by 1° C., and ii) for example, inputting data such as to-be-corrected timing and to-be-corrected temperature in the detection temperature's measurement data in a state where the target value processing is not implemented.

The parameter generator 52, the waveform generator 50 and the target value processing unit 51 are, for example, constructed with a computer.

<Process Controlling Method>

Hereinafter described are details about a process controlling method which is implemented by the control process implementing system having the above structure.

Posicast Control

Described at first is a posicast control which is an example of the target value response control.

Figure 13A:
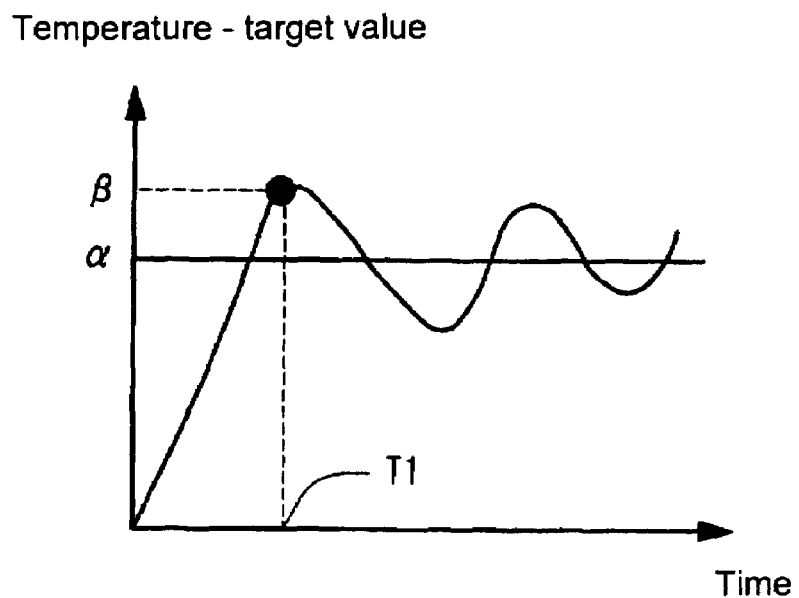
FIG. 13 shows a target value shaping operation of the target value processing unit, according to the embodiment.

For implementing the temperature control by using the temperature controller 3, as shown in FIG. 13A, the detection temperature moves from a temperature control start time point to a target value temperature α and then is stabilized at the target value temperature α. In the above period, the target value temperature α may be temporarily exceeded, causing what-is-called an overshoot. With the overshoot caused in the temperature process control, response time of temperature control may be elongated for converging the overshoot, which is a failure.

For preventing the overshoot, the target value processing unit 1 implements the following process on the target value signal which is supplied from the target value signal supplying unit 2. Specifically, with the overshoot caused, a control profile tracing an elapse where the temperature is converged to the target value has a multiplicity of peak time points (time point where temperature change quantity is 0) where a plus temperature change quantity is converted to minus. Among the above peak time points, the overshoot at the first peak time point is the most severe.

Figure 13B:
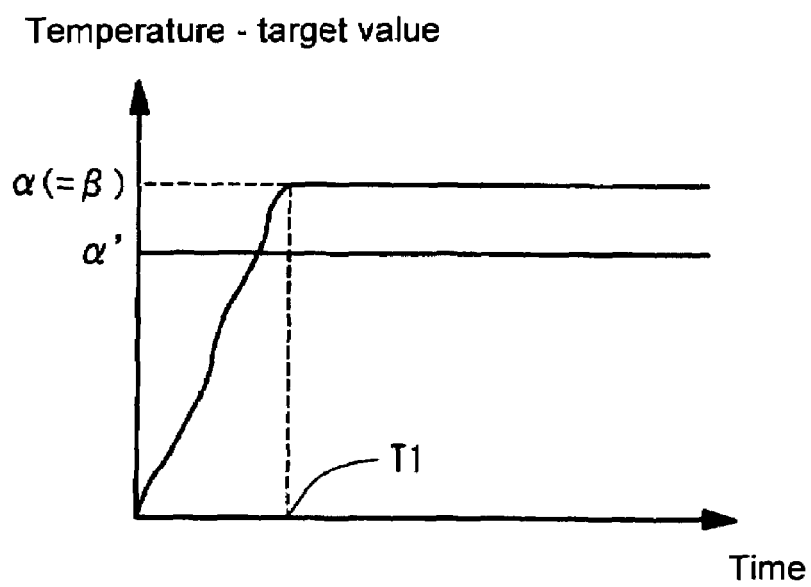

The above temperature control time point is defined as T1, and a temperature obtained at T1 is defined as β. As shown in FIG. 13B, a transitional target value temperature α' is so set that the detection temperature β at the time point T1 can conform to the target value temperature α.

Specifically, the process shaping is implemented such that the transitional target value temperature α' is slightly lower than the target value temperature α shown by the inputted target value signal, to thereby conform the detection temperature β at the time point T1 to the target value temperature α.

Moreover, after the time point T1, the target value signal is so shaped that the target value temperature can return to the original target value temperature α. In other words, the processing of the target value signal is not implemented after the time point T1.

The thus shaped signal pattern of the shaped target value signal is to be memorized in advance in the third memory 31. The shaped target value signal is made for each of a multiplicity of the heat objects W, and is to be memorized in the third memory 31.

For implementing the posicast control, at first, a specific signal (Load order) showing that the posicast control implements temperature control of an arbitrary heat object W is outputted from the target value signal supplying unit 2 and the like to the target value processing unit 1. The specific signal is sensed with the decode circuit 29. Based on the sensing of the specific signal by the decode circuit 29, the access control circuit 30 may output to the third memory 31 an order for i) reading out the shaped target value signal used for implementing the posicast control of the heater H's heat object W (semiconductor wafer and the like) in this temperature controlling and then ii) writing out the thus read-out shaped target value signal to the second memory 26. The third memory 31 receiving the above order may read out a designated shaped target value signal, to thereby store the thus designated shaped target value signal in the second memory 26.

After implementing the above preparation, the target value processing unit 1 may implement processing of the target value. Specifically, when the heater H starts temperature control of the heat object W, the output switch circuit 27 may selectively read out from the second memory 26 the shaped target value signal for posicast control. The thus read-out shaped target value signal may be converted to an analog signal by the D/A converting circuit 28, to thereafter be outputted to the temperature controller 3. Based on the thus supplied shaped target value signal, the temperature controller 3 may implement temperature control of the heater H.

Herein, the temperature controller 3 itself may implement the control as is along the inputted target value signal.

However, the target value signal inputted to the temperature controller 3 is the one shaped for the posicast control. Therefore, although implementing a control like the control as is, the temperature controller 3, as a result, implements the posicast control.

Herein, the posicast control is implemented only in the heat control starting period when the overshoot is caused. Therefore, when the heat control starting period is ended, the timing sensing circuit 21 detecting the above ending may output a control switch order to the output switch circuit 27. The output switch circuit 27 receiving the control switch order may stop selecting the shaped target value signal supplied from the second memory 26, instead, select an unprocessed target value signal (digital) supplied from the A/D converting circuit 20 through the timing sensing circuit 21, to thereby output the thus selected unprocessed target value signal (digital) to the D/A converting circuit 28. The target value signal is converted to an analog signal by the D/A converting circuit 28, to thereafter be supplied to the temperature controller 3.

Based on the thus supplied unshaped target value signal, the temperature controller 3 may implement heat control of the heater H. Therefore, the temperature controller 3 implements the control along the inputted target value signal. At this point in time, the heat control starting period in need of the posicast control is ended. Therefore, implementing the temperature control as is which uses the target value signal causes no problem. In this manner, by switching periodically the shaped target value signal with the unshaped target value signal, the target value processing unit 1 implements the final shaping of the target value signal.

Implementing the above control allows the temperature of the control object to reach rapidly the target value temperature and to be stabilized at the temperature, without causing the overshoot.

Figure 14A:
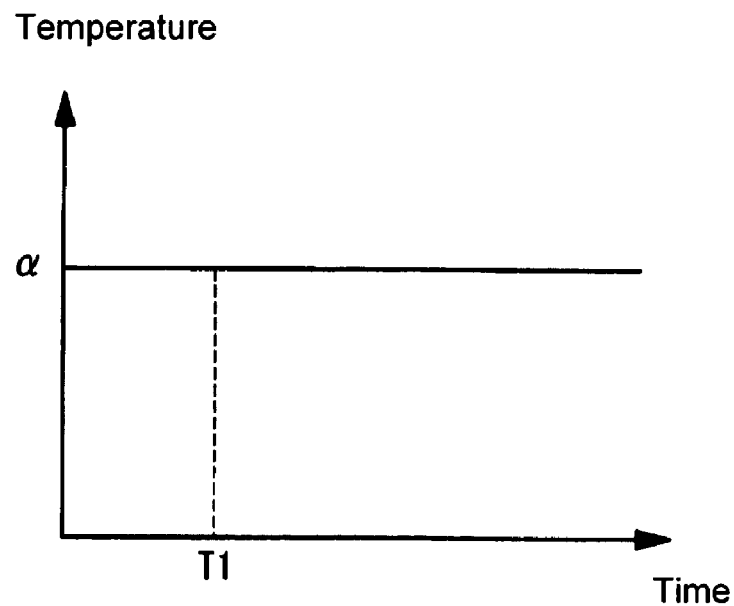
FIG. 14 shows the target value shaping in FIG. 13.
Figure 14B:
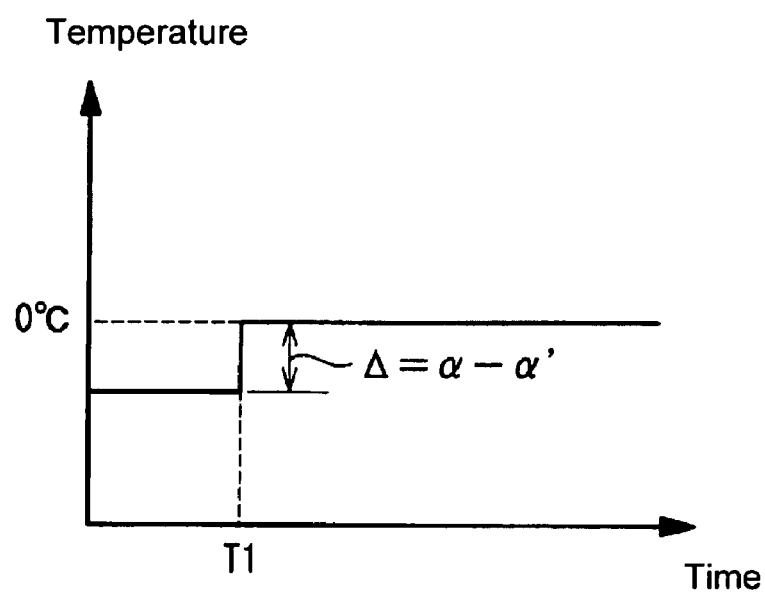

This posicast control is to be explained based on, for example, the functional block diagram in FIG. 5. The waveform generator 50, as shown in FIG. 14B, keeps the target temperature value α at α' in a period from the temperature control start time point to the time point T1, causing $-\Delta=\alpha-\alpha'$, and after the time point T1, generating a processing waveform of 0° C. Then, the target value processing unit 51 adds the thus generated processing signal waveform and the target value signal in FIG. 14A, to thereby output the addition as the shaped target value signal.

Therefore, setting the model parameter for showing the processing waveform in FIG. 14B may work. For example, setting the above temperature table showing the time relative to the temperature may work.

Disturbance Response Control

Hereinafter described is a disturbance response control which is implemented by the target value processing unit 1 having the above structure.

Figure 15A:
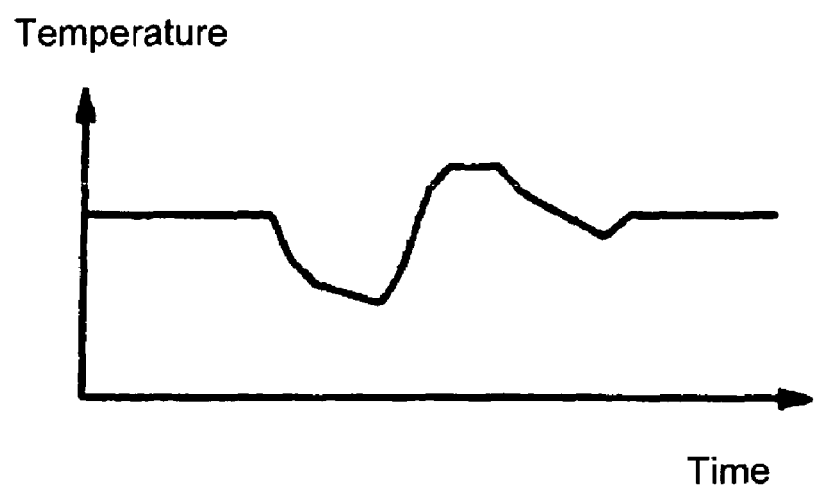
FIG. 15 shows the target value shaping operation of the target value processing unit, according to the embodiment.

As shown in FIG. 15A, in the implementing of temperature control of the heater H, installing a new heat object W on a heat face of the heater H may cause a temperature change to the heater H. In the temperature control, the above temperature change may become a disturbance disordering the control. With the disturbance caused, the detection temperature of the temperature sensor 10 may periodically cause fluctuations such as down, up, overshoot, down along time series, to thereafter be converged to the target value. When the above control fluctuation attributable to the disturbance is caused, the target value processing unit 1 may implement the following the target value shaping for increasing response speed of the target value.

Figure 15B:
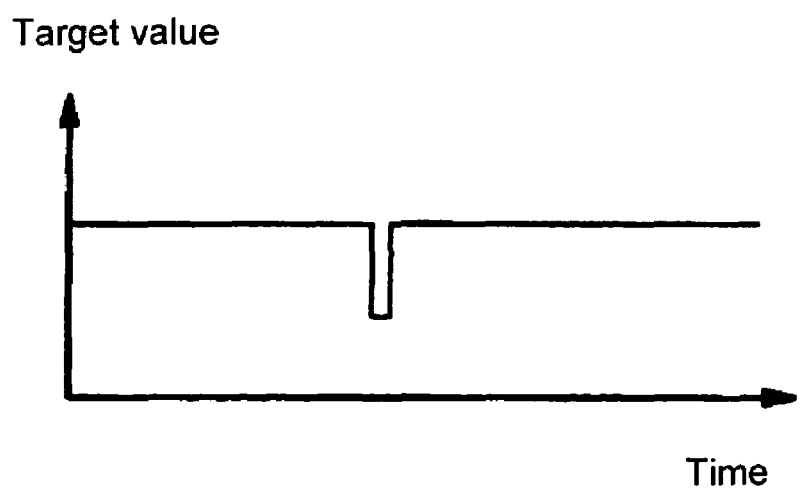

At first, in a temperature controlled state where the target value processing is not implemented, the disturbance is to be preliminarily generated by installing the heat object W on the heater H which keeps the target value temperature. In the above state, the temperature change of the heater H is to be sensed with the temperature sensor 10, with a sensing result thereof measured by the sensing circuit 24. Then, based on the thus measured disturbance, the calculating circuit 25 is used for calculating mode of a target value for extinguishing the disturbance (temperature fluctuation), as shown in FIG. 15B.

Calculating the mode of the target value for extinguishing the disturbance is for calculating the waveform's timing and scale for suppressing the overshoot, as described above, the calculating being based on i) the detection temperature which is measured when the disturbance is generated preliminarily in the temperature controlled state where the target value processing is not implemented and ii) the detection temperature which is measured when the target value is changed stepwise by the standard quantity.

Herein, especially calculated is the mode of the target value that extinguishes the overshoot caused by the disturbance. Specifically, like the suppressing of the overshoot in FIG. 15A, the target value is so shaped as to be low in a certain period. Then, the target value signal's shaped pattern made by calculation is to be memorized in the third memory 31 as the shaped target value signal.

In an actual disturbance response controlling, the temperature sensor 10 may sense that the heat object W is installed on the heater H, then a detection signal thereof is outputted to the target value processing unit 1. In the target value processing unit 1, after the decode circuit 29 detects that the sensor detection signal is received, the access control circuit 30 may output to the third memory 31 an order for reading out a shaped target value signal for extinguishing the disturbance. With this, the shaped target value signal for disturbance response may be read out from the third memory 31, to be supplied to the temperature controller 3 via the output switch circuit 27 and the D/A converting circuit 28. Based on the thus supplied shaped target value signal, the temperature controller 3 may implement the disturbance response control.

Herein, the temperature controller 3 itself may implement the control as is along the inputted target value signal. However, the target value signal inputted to the temperature controller 3 is the shaped target value signal for the disturbance response. Therefore, although implementing a control like the control as is, the temperature controller 3 can, as a result, implement the disturbance response extinguishing control.

Herein, the above disturbance response control is implemented only in an initial disturbance period. Therefore, with the initial disturbance period ended, the timing sensing circuit 21 detecting the above ending may output a control switch order to the output switch circuit 27. The output switch circuit 27 receiving the control switch order may stop selecting the shaped target value signal supplied from the second memory 26, instead, may select the unshaped target value signal (digital) supplied from the A/D converting circuit 20 through the timing sensing circuit 21, to thereby output the thus selected unshaped target value signal (digital) to the D/A converting circuit 28. The unshaped target value signal is converted to an analog signal by the D/A converting circuit 28, to thereafter be supplied to the temperature controller 3. Based on the thus supplied shaped target value signal, the temperature controller 3 may implement heat control of the heater H. Therefore, the temperature controller 3 may implement the control as is along the inputted target value signal. At this point in time, the initial disturbance period is ended. Therefore, implementing the temperature control as is using the target value signal causes no problem. In this manner, by switching periodically the shaped target value signal with the unshaped target value signal, the target value processing unit 1 implements the final shaping of the target value signal to thereby make the shaped target value signal.

Herein, the timing of the disturbance generation attributable to the installing of the new heat object W may be, for example, detected by sensing of a timing for starting an elevator (installing unit) for installing the heat object W on the heater H. In this case, the thus sensed timing for starting the elevator is slightly earlier than the actual disturbance generation timing. Therefore, the timing for starting the disturbance response control needs to be moved behind the timing for detecting the start of the elevator. A treatment of delaying (moving behind described above) the control start can be implemented, for example, by the timer 22.

Command Shape Control

Hereinafter described is a command shape control which is preferably used for the above disturbance response control.

Figures 16A, 16B, 16C, 16D:
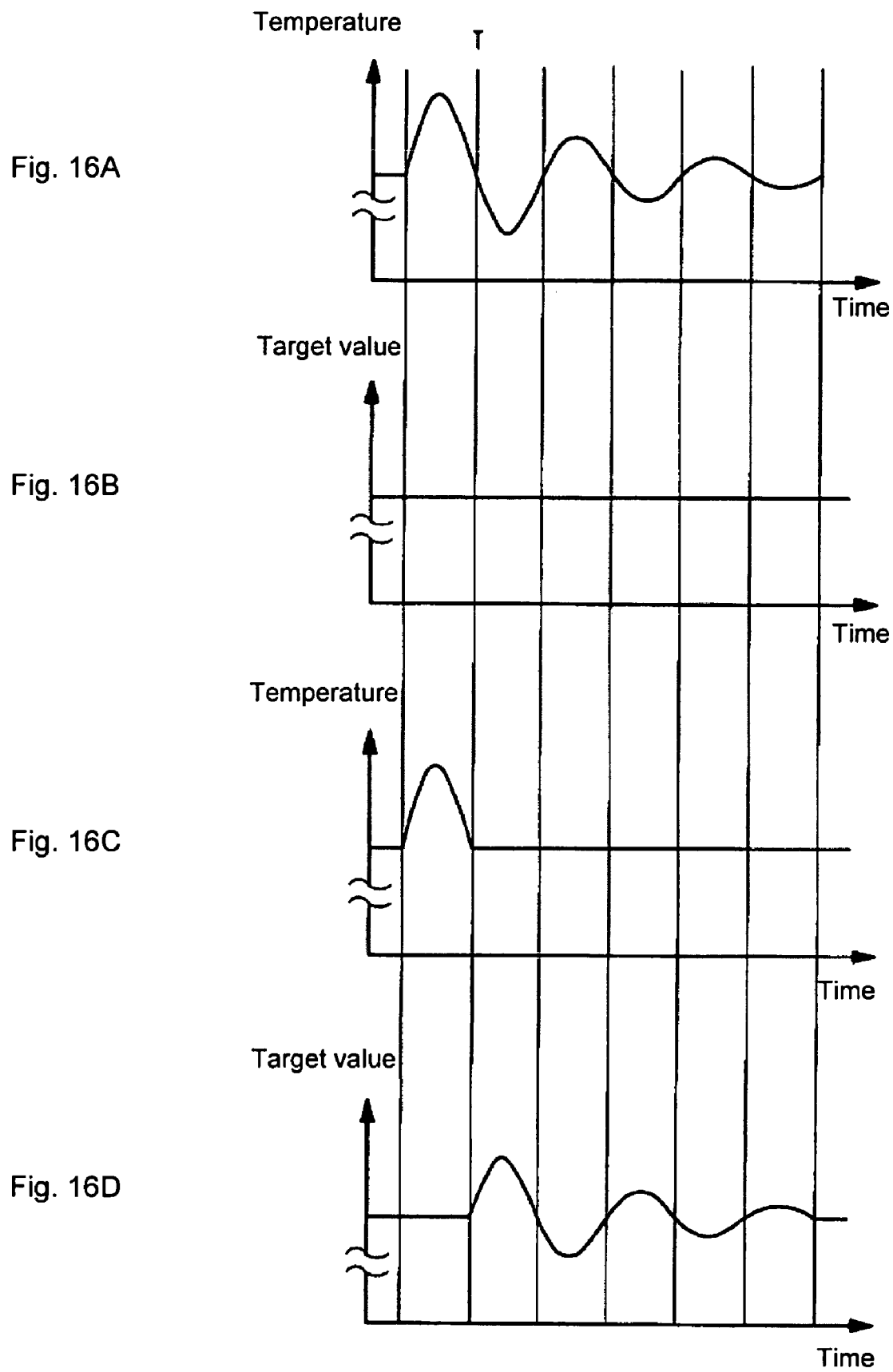
FIG. 16 shows a command shape control.

FIG. 16A shows a remaining vibration where the detection temperature of the temperature sensor 10 is periodically fluctuated by the disturbance along time series, to be converged to the target value. Herein, FIG. 16B shows a target value when the remaining vibration is present.

When the control fluctuation attributable the disturbance and the like is caused, the command shape control may be implemented for prompting response speed for converging to the target value. In this case, as shown in FIG. 16D, the processing is so implemented that a fluctuation having the same period and a reverse phase relative to those of the generated temperature fluctuation in FIG. 16A is given to the target value.

In the disturbance generation, for example, at a time point T, as shown in FIG. 16D, so implementing the command shape control that the target value can have a reverse phase relative to the temperature fluctuation may, as shown in FIG. 16C, increase the target value's response speed at the disturbance generation. In the temperature controlling of the heater H with the semiconductor wafer (which is known in advance in terms of its material, form, weight and the like) as the heat object W, the generated disturbance can be measured in advance. Therefore, the target value processing unit 1 can implement the command shape control in the following manner.

In a temperature controlled state where the target value processing is not implemented and the target value temperature is kept, the remaining vibration of the detection temperature which is measured when the disturbance is preliminarily generated by installing the heat object W on the heater H is to be measured as disturbance by using the sensing circuit 24. Then, based on the thus measured disturbance, the mode of the target value for converging the disturbance by the command shape control is to be calculated by the calculating circuit 25. Then, the target value signal thus calculated is to be memorized in the third memory 31 as the shaped target value signal.

In an actual command shape controlling, the temperature sensor 10 may sense that the heat object W is installed on the heater H, and a detection signal thereof is outputted to the target value processing unit 1. In the target value processing unit 1, after the decode circuit 29 detects that the sensor detection signal is received, the access control circuit 30 may output to the third memory 31 an order for reading out a shaped target value signal for the command shape control. With this, the shaped target value signal for the command shape control may be read out from the third memory 31 and supplied to the temperature controller 3 via the output switch circuit 27 and the D/A converting circuit 28. Based on the thus supplied shaped target value signal, the temperature controller 3 may implement the command shape control.

Herein, the temperature controller 3 itself may implement the control as is along the inputted target value signal. However, the target value signal inputted to the temperature controller 3 is shaped for the command shape control. Therefore, although implementing a control like the control as is, the temperature controller 3 can, as a result, implement the command shape control.

Herein, the command shape control is implemented only in the initial disturbance period. Therefore, when the initial disturbance period is ended, the timing sensing circuit 21 detecting the above ending may output the control switch order to the output switch circuit 27. The output switch circuit 27 receiving the control switch order may stop selecting the shaped target value signal supplied from the second memory 26, instead, select an unprocessed target value signal (digital) supplied from the A/D converting circuit 20 through the timing sensing circuit 21, to thereby output the thus selected unprocessed target value signal (digital) to the D/A converting circuit 28.

The unshaped target value signal is converted to an analog signal by the D/A converting circuit 28, to thereafter be supplied to the temperature controller 3. Based on the thus supplied unshaped target value signal, the temperature controller 3 may implement the heat control of the heater H. Therefore, the temperature controller 3 may implement the control as is along the inputted unshaped target value signal. At this point in time, the initial disturbance period in need of the command shape control is ended. Therefore, implementing the temperature control as is using the unshaped target value signal may cause no problem. In this manner, by switching periodically the shaped target value signal with the unshaped target value signal, the target value processing unit 1 implements the final shaping of the target value signal.

Antireset Windup Control

The target value processing unit 1 can implement an antireset windup control described below.

Many of the control objects of the actual the temperature controller 3 have a saturation characteristic such as the heater H's output limit.

With the temperature controller 3 having an integrator such as PID control, when an integrated deviation shows a saturation quantity exceeding a saturation characteristic thereof, a reset windup phenomenon (integrator windup phenomenon) may be caused. Once the reset windup phenomenon is caused, an original PID control function is not be recovered until the saturated integration value returns within a saturation limit. In this state, the overshoot is likely to be generated, moreover, causing a failure such as an elongated time for control response.

Examples of known methods of suppressing the antireset windup phenomenon include: i) a controlling method of stopping integration in a period when the integrator is saturated, ii) a controlling method of switching to PD control in a period when the deviation is large and switching to PID control again at a time point when the saturation is converged, and iii) an automatic match PI controlling method.

In the target value processing unit 1, the antireset windup control may be implemented in the following manner. In this case, as indicated by a virtual line in FIG. 1, a subtractor 41 may calculate a difference between a control process operation quantity inputted to a limiter 40 which is incorporated in the temperature controller 3 and limits a control process operation quantity, and a control process operation quantity outputted from the limiter 40. The above difference, specifically, the saturation quantity is to be inputted to the target value shaping unit 6.

The target value shaping unit 6 may shape the target value signal such that the above difference can rapidly be extinguished. The target value shaping unit 6 can generate the shaped target value signal subjected to the antireset windup control, for example, based on the following equation (1).

$$SPr = SP + G(s)(ur - u) \quad (1)$$

SPr: shaped target value signal
SP: unprocessed target value signal
G(s): transfer function matrix proper for antireset windup control
ur: control process operation quantity inputted to limiter 40 of temperature controller 3
u: control process operation quantity outputted from limiter 40

In the antireset windup control by the target value processing unit 1, generating the shaped target value signal and supplying the thus generated shaped target value signal to the temperature controller 3 in such a manner as to maximize capability-characteristic of the heater H controlled with an arbitrary temperature controller 3 can improve the heater H's capability-characteristic to its maximum. In this case, an operational object of the temperature controller 3 and the like is, in general, a power element. Therefore, implementing the antireset windup control in the target value processing unit 1 can prevent a control that uses up 100% of the capability of the operational object (power element). This may lead to an elongated life and an improved energy of the operational object (power element).

Figure 17:
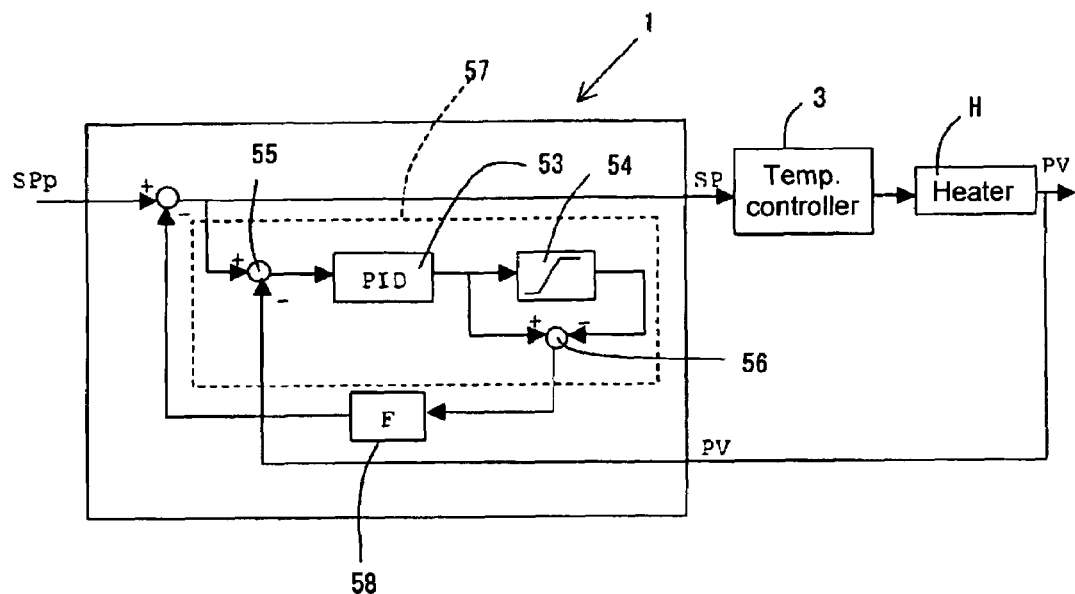
FIG. 17 shows a functional block diagram, according to another embodiment.

FIG. 17 is a functional block diagram of the target value processing unit 1, showing a structure of the antireset windup control, according to another embodiment of the present invention.

In the target value processing unit 1 according to this embodiment, for allowing implementation of the antireset windup control before the control process operation quantity of the temperature controller 3 is saturated, a saturation quantity forecaster 57 may forecast the saturation operation quantity of the temperature controller 3, and the thus forecasted saturation quantity is to be subtracted (processed) from a target value signal SPp at a desired feedback gain F, to thereby cause a shaped target value signal SP.

For forecasting the saturation operation quantity of the temperature controller 3, the target value processing unit 1 is provided with i) a PID controller 53 like that of the temperature controller 3, ii) a limiter 54 a little more limiting than the limiter 40 of the temperature controller 3,
   iii) a first subtractor 55 calculating deviation between the shaped target value signal SP given to the temperature controller 3 and a detection temperature PV, iv) a second subtractor 56 calculating a forecasted saturation quantity which is a difference between the limiter 54's input and output, and v) a feedback element 58.

As a model parameter, a PID parameter is set to the PID controller 53, where this PID parameter is the same as that of a PID controller incorporated in the temperature controller 3.

Therefore, before the temperature controller 3 has the saturation of the control process operation quantity, the forecasted saturation quantity is to be outputted in the target value processing unit 1. For example, when the detection temperature is decreased to thereby increase the deviation, the process control operation quantity is saturated and the saturation is likely to be generated. In this case, the forecasted saturation quantity is outputted and a value proportional to the forecasted saturation quantity is subtracted from the target value signal with a third subtractor 56 (target value processing unit 51) and is outputted as the shaped target value signal. Therefore, the target value inputted to the temperature controller 3 may be decreased, as a result, the temperature controller 3 does not have the saturation of the control process operation quantity. Summarizing the above, the antireset windup control can be implemented in the target value processing unit 1, not by the temperature controller 3.

The feedback gain F of the feedback element 58 can be variably set. For such structure, the entire content of Japanese Patent Application No. 2003-122389 (Japanese Patent Application Laid-Open No. 2004-86858) entitled "CONTROLLER, TEMPERATURE CONTROLLER AND THERMAL TREATMENT EQUIPMENT" and proposed by the present applicant is incorporated herein by reference.

Based on a stabilization condition of feedback loop, this feedback gain F may be limited in terms of variable set scope.

Herein, the feedback element 58 may be any of P control, PI control and PID control.

Figure 18:
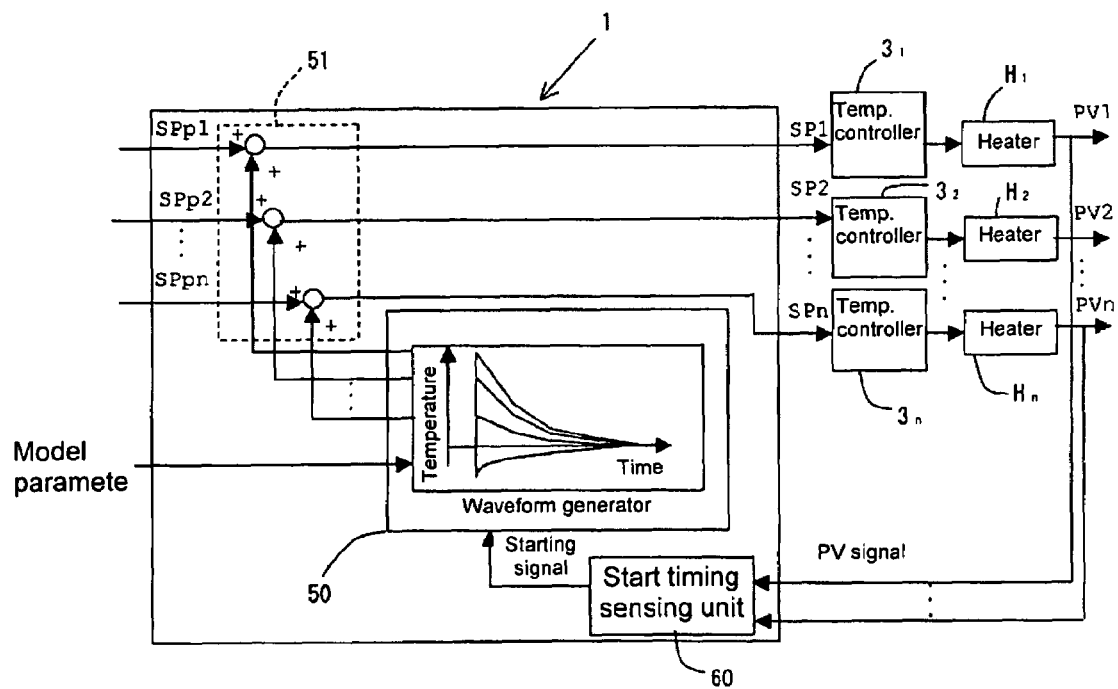
FIG. 18 shows a functional block diagram, according to still another embodiment.

FIG. 18 is a functional block diagram of the target value processing unit 1, according to still another embodiment of the present invention, showing a structure like that in FIG. 5.

This embodiment is preferable for suppressing the variation in temperature of a multiplicity of channels, thereby unifying the temperatures.

The waveform generator 50 of the target value processing unit 1 is provided with a model parameter for suppressing variation of each channel, for example, a temperature change width (amplitude) of each channel.

Based on the detection temperatures $PV_1$ to $PV_n$ of the respective channels, for example, based on changes in average temperature thereof, the waveform generator 50 may generate an amplitude waveform corresponding to the model parameter, in response to a starting signal from a start timing sensing unit 60 which senses the start timing. Then, the target value processing unit 51 may add to the target values $SPp_1$ to $SPp_n$ of the respective channels, to thereby give to the temperature controllers $3_1$ to $3_n$ of the respective channels as the shaped target value signals $SP_1$ to $SP_n$.

The model parameter, like the above description, is so determined as to suppress temperature variation of each channel measured in advance.

This embodiment is preferable for the disturbance response control and the target value response control.

Figure 19:
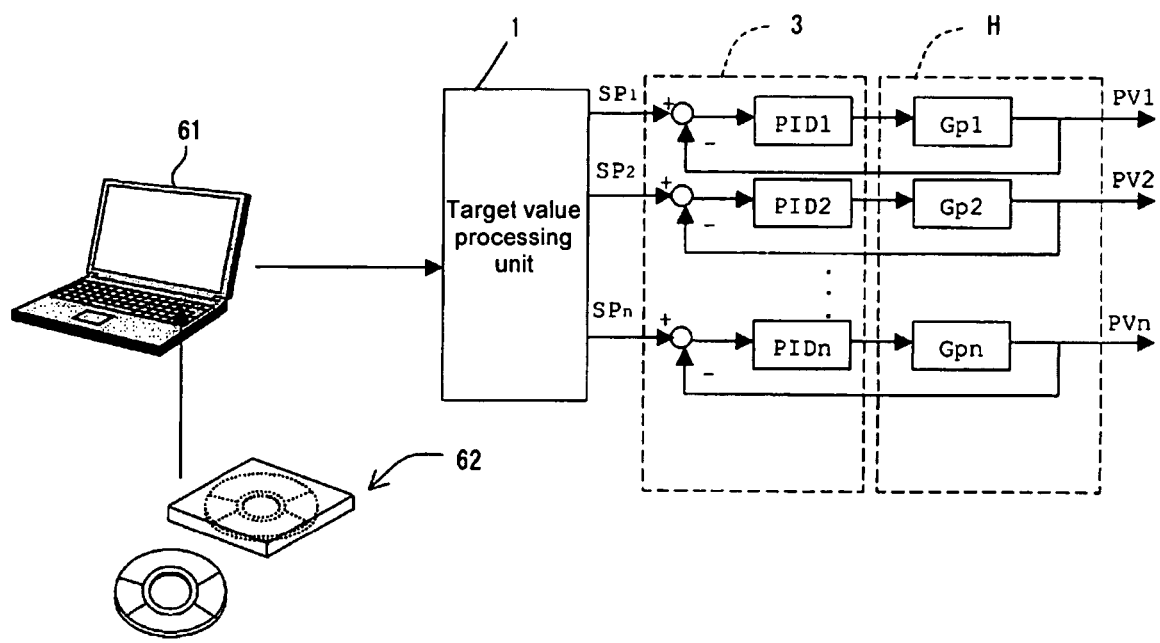
FIG. 19 shows a method of setting to the target value processing unit.

FIG. 19 shows an example of a structure for inputting settings to the target value processing unit 1.

Installing therein the programs recorded in a recording medium 62 such as CD, a personal computer 61 as a target value signal supplying unit may input to the target value processing unit 1 settings such as a target value, a model parameter and object information.

Herein, the following object information may be recorded in advance in the recording medium 62, or be measured by connecting a measurement unit such as a temperature logger of the personal computer 61:

a) the control object's detection temperature which is measured in a temperature controlled state where the target value is not processed, and b) the control object's detection temperature which is measured when the target value is changed, for example, stepwise by a standard quantity.

Based on the set target value, the model parameter, the object information and the like, the target value processing unit 1 may implement the various target value processings as described above.

Herein, on the personal computer 61's screen, displaying a block diagram and the like of the control system and making various editings are allowed.

As described above, after processing the target value signal into the shaped target value signal, the target value processing unit 1 supplies the thus shaped target value signal to the temperature controller 3, thereby allowing implementation of higher-level process control without changing at all the structure of the temperature controller 3. Moreover, some of the temperature controllers 3 can implement high-level process control by changing software, even in this case, however, adjusting details of the process control may become very difficult. Contrary to the above, the target value processing unit 1 can implement the higher-level process control without changing at all the structure of the temperature controller 3, bringing about a greater effect of establishing the target value processing unit 1.

Herein, as long as being capable of implementing at least one of the various controls including the above posicast control, disturbance response control and the like, any target value processing unit 1 is allowed.

Moreover, FIG. 2 and FIG. 3 show the structure where one target value processing unit 1 and one temperature controller 3 are coupled by the terminal bench 4. However, for simultaneously process-controlling a multiplicity of process control objects (heater H), the temperature controller 3 is to be provided for each of the process control objects. In this case, coupling the terminal bench sections 4b with each other (each of which is provided for one temperature controller 3) can couple the temperature controllers 3 with each other via the terminal bench sections 4b. In the above using mode, the terminal bench section 4a for the target value processing unit 1 provided for each of the temperature controllers 3 may be coupled to the terminal bench section 4b. With this, a multiplicity of the temperature controllers 3, . . . , can be united with a multiplicity of the target value processing units 1 via the terminal bench 4.

According to the above embodiment, the temperature controller 3 is disclosed as a regulator for controlling temperature of the heater H and the like. The present invention is, however, not limited to the above regulator. Any other regulators such as a regulator implementing valve's open-close control in another control process can likewise be implemented.

Moreover, the present invention can be preferably implemented for temperature control of a multiplicity of continuous zones in places such as a reflow furnace and a continuous furnace.

The scope of the present invention is defined with reference to the following claims.

What is claimed is:

1. A target value processing unit, comprising:
   an input section to which a target value signal that includes information indicative of a target value of a control process is inputted;
   a target value shaping unit communicatively connected to the input section and configured to adjust the target value signal into a signal form which is proper for use in controlling a regulator implementing the control process, the target value shaping unit further configured to receive an observation quantity of a control object which is controlled with the regulator; and
   an output section communicatively connected to the target value shaping unit and the regulator and configured to output, to the regulator, an adjusted target value signal which is adjusted by the target value shaping unit.

2. The target value processing unit as claimed in claim 1, further comprising at least one of:
   a coupler for detachably coupling the target value processing unit to the regulator, and
   a communicating member for communicatively connecting the target value processing unit with the regulator.

3. The target value processing unit as claimed in claim 2, wherein
   the output section is so structured as to be detachably electrically connected to a target value input section of the regulator by the coupler which makes a mounting-dismounting operation of the target value processing unit and the regulator.

4. The target value processing unit as claimed in claim 1, further comprising:
   a memory unit storing in advance a shaped pattern of the target value, wherein
   the target value shaping unit adjusts the target value signal inputted to the input section based on the shaped pattern stored in the memory unit.

5. The target value processing unit as claimed in claim 4, wherein
   the target value shaping unit adjusts the target value signal inputted to the input section such that an observation quantity of a control object controlled with the regulator reaches rapidly to the target value.

6. The target value processing unit as claimed in claim 5, wherein
   in a period when the observation quantity causes at least one of an overshoot and an undershoot, the target value processing unit adjusts the target value signal such that a peak value of the observation quantity causing the at least one of the overshoot and the undershoot becomes the target value.

7. The target value processing unit as claimed in claim 4, wherein
   the target value shaping unit takes the following operations:
   taking in an observation quantity of a control object which is controlled with the regulator in a state where an unshaped target value signal is supplied in advance to the regulator, and
   making the adjusted pattern of the target value and storing the adjusted pattern of the target value in the memory unit such that the thus taken-in observation quantity rapidly reaches the target value, and
   wherein
   in the target value shape control, the target value shaping unit reads out the adjusted pattern from the memory unit to thereby implement the adjusting of the target value signal.

8. The target value processing unit as claimed in claim 7, wherein
   the target value shaping unit receives in advance the observation quantity which is obtained when a disturbance is applied, and
   the target value shaping unit makes the adjusted pattern of the target value such that an influence by the disturbance is rapidly extinguished from the received observation quantity, to thereby store the adjusted pattern in the memory unit.

9. The target value processing unit as claimed in claim 1, wherein
the regulator has a limiter for limiting a control process operation quantity to be outputted to a control object, and
the target value shaping unit receives a differential output between the control process operation quantity inputted to the limiter and the control process operation quantity outputted from the limiter, and adjusts the target value signal such that the received differential output is rapidly extinguished.

10. The target value processing unit as claimed in claim 1, further comprising:
a waveform generator for generating a waveform based on a parameter to be set, and
a processing unit for processing the target value signal to be outputted as the adjusted target value signal based on the waveform generated by the waveform generator.

11. The target value processing unit as claimed in claim 1, further comprising:
a parameter generator for generating a parameter by receiving the following:
an observation quantity of a control object which is controlled with the regulator in a state where an unadjusted target value signal is supplied in advance to the regulator, and
an observation quantity of a control object which is controlled with the regulator in a state where a predetermined target value signal is supplied to the regulator,
a waveform generator for generating a waveform based on the parameter generated by the parameter generator, and
a processing unit for processing the target value signal to be outputted as the adjusted target value signal based on the waveform generated by the waveform generator.

12. The target value processing unit as claimed in claim 1, further comprising:
a saturation quantity forecaster for forecasting a saturation quantity of a control process operation quantity of the regulator, and
a processing unit for processing the target value signal based on the saturation quantity forecasted by the saturation quantity forecaster in such a manner as to eliminate the forecasted saturation quantity and then output the processed target value signal as the adjusted target value signal.

13. A temperature controller, comprising:
a target value input section to which the adjusted target value signal outputted from the output section of the target value processing unit as claimed in claim 1 is inputted.

14. A control process implementing system, comprising:
a target value supplying unit for generating a target value signal indicative of a target value of a control process;
the target value processing unit as claimed in claim 1 which adjusts the target value signal generated by the target value supplying unit; and
a regulator implementing a control process based on the adjusted target value signal adjusted by the target value processing unit.

15. A process controlling method, comprising:
a target value supplying step of generating a target value signal indicative of a target value of a control process;
a target value processing step of observing a quantity of a control object controlled with a regulator and adjusting the generated target value signal into a signal form which is proper for use in controlling the regulator implementing the control process; and
a control process implementing step of implementing the control process based on the shaped target value signal.

16. A computer program product embodied in computer-readable medium and comprising code that, when executed, causing a computer to perform target value processing for adjusting a target value signal that includes information indicative of a target value of a control process into a signal form which is proper for use in controlling a regulator implementing the control process, the target value processing comprising the steps of:
a step of generating a waveform based on a set parameter; and
a step of processing the target value signal to be outputted to the regulator based on the generated waveform.

17. The target value processing unit as claimed in claim 1, wherein the regulator is a heat regulator for controlling heat supplied to a semiconductor wafer during a semiconductor fabrication process.

18. The target value processing unit as claimed in claim 1, wherein the target value shaping unit comprises:
an A/D converting circuit for receiving the target value signal and for converting the target value signal to a digital target value signal;
a timing sensing circuit configured to receive the digital target value signal and to sense a timing when the target value signal is inputted to the target value processing unit;
a timer that determines a time when the target value signal was inputted to the target value processing unit, and to output a timing order signal accordingly;
a first memory configured to store a memory timing order output by the timer, the first memory further storing a sensed signal output by a sensor that is indicative of a sensed value of a device to be controlled;
a determinant circuit communicatively connected to the first memory and the A/D converting circuit, and configured to compare the sensed signal stored in the first memory with the digital target value signal, so as to determine if the signals differ by more than a predetermined amount, the determinant circuit outputting an abnormal indication signal when the sensed signal and the digital target value signal different by more than the predetermined amount.

* * * * *